Figure 1:
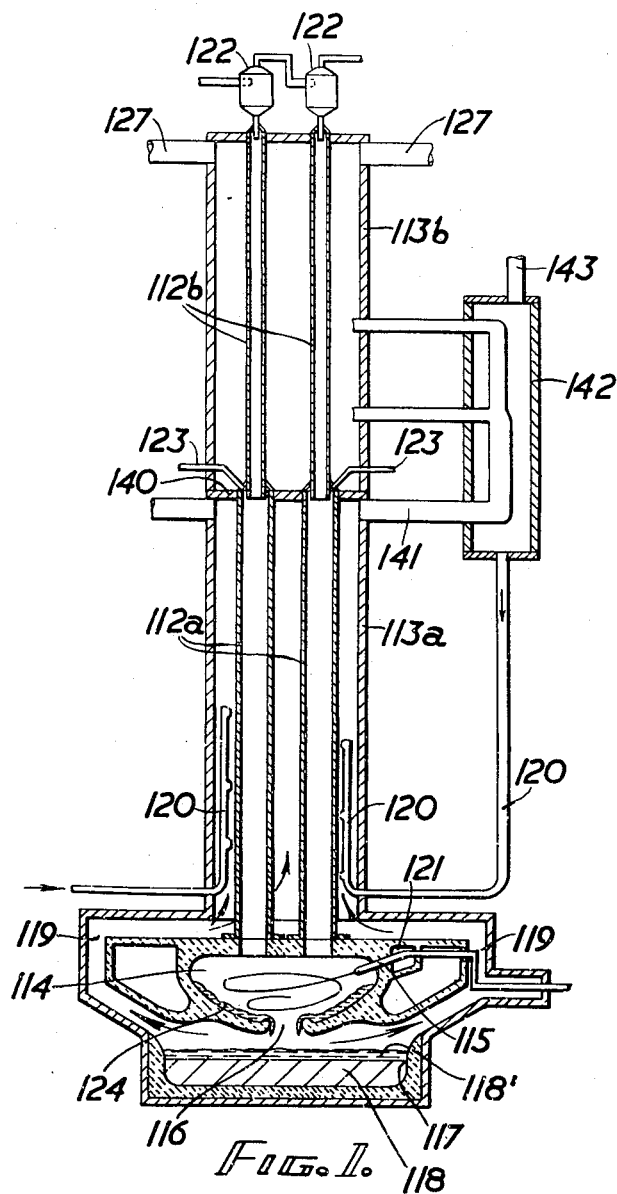

Dec. 23, 1958  S. KLEMANTASKI  2,865,734
TREATMENT OF METAL-CONTAINING MATERIALS
Filed July 16, 1956  2 Sheets-Sheet 2

INVENTOR
SIDNEY KLEMANTASKI
BY Hane and Nydick
ATTORNEYS

United States Patent Office 2,865,734
Patented Dec. 23, 1958

2,865,734

TREATMENT OF METAL-CONTAINING MATERIALS

Sidney Klemantaski, London, England, assignor to The British Iron and Steel Research Association, London, England, a British company Application July 16, 1956, Serial No. 598,099

Claims priority, application Great Britain July 19, 1955

7 Claims. (Cl. 75—40)

This invention relates to the treatment of metal-containing materials. While being specially concerned with the making of steel from iron-bearing ores, it is also applicable to the treatment of other metallic ores and similar metal containing materials such as pyritis residues; in this specification and appended claims, the term "ores" is to be understood as including these other materials.

Present methods of steel making are unsatisfactory to some extent. In the first place, oxygen removal in the blast furnace cannot be properly controlled so that considerable quantities of carbon and phosphorus dissolve in the iron and require to be removed in slow supplementary processes. In the second place, present methods require the ores and the fuels to be in particular forms which are not always economically available; alternatively, the ores have to be preliminarily treated to bring them to the desired form.

Whereas it has previously been proposed to treat iron ores in powdered state in a reducing atmosphere to produce iron, the proposals have been unsatisfactory in that large quantities of fuel have been required and the heat generated by the fuel has not been utilised efficiently for the process.

An object of this invention is to provide a process for treating metal ores in which the entire reaction starting with the ores and resulting in the metal of prescribed oxygen potential is effected in a single continuous operation. In particular, it is an object to convert iron ores to steel or semi-steel in a single continuous process.

Another object of the invention is to provide a process for producing metals from ores in which the fuel for the process is employed efficiently.

As is well known, the oxygen potential of a metal is the concentration of oxygen in an atmosphere over the metal that would be in chemical equilibrium with the metal; thus when pig iron is converted to steel, the oxygen potential is increased.

In the process of the present invention, the ores in dispersed state are continuously supplied to and caused to pass along a reaction passage, reduction of the ores being effected in that passage prior to the arrival of the ores at a high temperature region where agglomeration of the metal occurs, and the oxygen potential of the metal is adjusted to a desired level at or before the high temperature region. The ores are thus continuously reduced and then the oxygen potential is adjusted to a desired level, the metal of the desired composition being obtained as the result of the single reaction. In the case of steel making, it is unnecessary, as is the present practice to treat the ores first to make pig iron and then to convert the pig iron to steel, with the attendant heavy heat losses; instead the steel of the desired oxygen potential is obtained directly from the ores.

The metal agglomerated in the high temperature region is collected in a reservoir or hearth and the hot gases from the high temperature region are passed over the hot metal to provide heat and chemical potential for any incompleted reactions and to make good heat losses.

In order to employ to best effect the fuel used in the process, it is preferred to employ the hot gases from the high temperature region, after they have passed over the hot metal, to heat the ores in the pre-reduction stage, prior to arrival at the high temperature region.

The oxygen potential may be adjusted by controlling the oxygen and/or fuel supplied to the high temperature region. The fuel may be in the form of powdered material or a gas and may be introduced with the dispersed ores to provide the reducing atmosphere by partial combustion caused by the heat supplied. Additional fuel may be introduced with fluxes, if required, at the high temperature agglomerising region. The oxygen supplied to this region may be in the form of pure oxygen, oxygen-rich air, or air; when air is used, it should be preheated to reduce the cooling effect of the nitrogen present. The preheating may be accomplished by heat exchange with the hot exhaust gases from the reaction.

Figure 2:
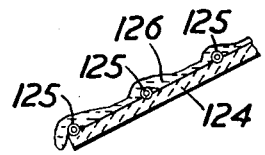
Figure 3:
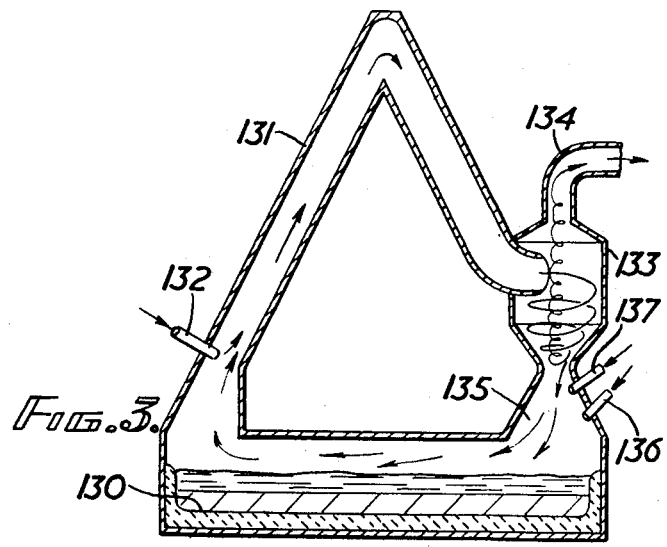

The invention will be more readily understood by way of example from the following description of steel making processes in accordance therewith, reference being made to the accompanying drawings, in which Figure 1 illustrates a recuperative process for making steel from iron ores, Figure 2 shows in section the wall of the cyclone reactor of Figure 1, and Figure 3 illustrates a concurrent flow process for making steel.

Referring to Figure 1, powdered iron ore and powdered coal are fed continuously down pipes 112 inside a column 113 to a combustion chamber 114 which is supplied with air, oxygenated air or oxygen for combustion through a nozzle 115. The combustion chamber has a single bottom opening 116 leading to a hearth 117 for agglomerated metal 118 and slag 118'. The hot gases from the combustion chamber pass over the hearth 117 and leave through pipes 119 which lead to the column 113 and which preferably contain a slag trap to remove any material entrained in the gases. Both the column 113 and the pipes 112 are in two parts. The upper and lower parts 113a, 113b of the column are separated from one end by the partition 140. The hot gases from the combustion chamber 114 pass into the lower part 113a and heat the lower sections 112a of the pipes 112 to a temperature exceeding 1300° C. before leaving through the outlet 141. They then pass into a heat exchanger 142 where their temperature is so lowered that, when they next pass into the upper part 113b of the column 113, the upper sections 112b of the pipes 112 are heated to a temperature not exceeding 900° C. Finally the gases leave the column through the outlets 127 which are connected to an extractor fan.

In the heat exchanger 142, air entering through 143 is heated before passing through pipes 120 to control the combustion of the hot gases in the lower part of the column 113. The lower sections of the pipes 112 are made from silicon carbide or other material able to withstand temperatures in excess of 1300° C. By maintaining the pipes at this temperature, the ores descending the pipes are caused to melt if they come into contact with the pipe surfaces so that sticking of the ores to the pipes and blocking of the pipes are prevented. On the other hand, the temperature of the upper parts 112b of the pipes is sufficiently low again to prevent this sticking so that in the result the ores never touch pipes at a temperature of between 900 and 1300° C., within which range sticking will occur.

In operation, the ore and coal are fed into the tubes 112 where they descend, the ore being progressively reduced by the partial combustion of the coal the required heat being transferred through the walls of the tubes 112. The desired temperature is maintained in the column 113 by the supply of air through the ducts 120 to control combustion of the hot gases. From the tubes 112, the partially reduced ore passes with the coal into the combustion chamber 114 where flux is added if required and air is introduced through nozzle 115. The oxygen of the air reacts exothermally with the descending material and to supply a source of heat to agglomerate the metal. When the ores reach the chamber 114, they have already been reduced, probably to carburised iron, and the amount of oxygen supplied through nozzle 115 is adjusted so that the oxygen potential of the metal is raised to that of the steel required.

The nozzle 115 and the chamber 114 are arranged to cause a cyclone action in chamber 114 to increase the time of reaction in the chamber and to cause slag and metal to be thrown on to the walls of the chamber. The metal as it passes over the slag covered walls is subject to the reaction so that when it passes out of the chamber into the hearth 117 it has been brought substantially to the desired oxygen potential. Although the use of the cyclone is preferred, it may be dispensed with, the slag and metal separating out into the hearth 117 by gravity.

As previously explained, the hot gases also leave the chamber 114 by the opening 116 and pass over the hearth. Here they pass over the agglomerated liquid to provide heat and chemical potential for any incompleted reactions and to make good heat losses. As the metal layer 118 is protected by the slag 117, it is possible to have a high degree of combustion of the coal, with a corresponding high concentration of carbon dioxide; the heat supplied by the gases will enable reaction to take place which causes reduction of oxygen potential of the metal 118 where desired without the high concentration of carbon dioxide, or low $CO/CO_2$ ratio affecting it in the opposite sense. Once the metal and slag have separated into distinct layers, combustion of the gases can be allowed to proceed further by the introduction of additional oxygen-containing gas above the hearth 117 without substantially affecting the oxygen potential of the metal except by the increased temperature as mentioned above since the metal is isolated from the gases by the slag layer.

The hot gases leaving the hearth through the pipes are reduced in temperature to that desired for the recuperator column 113. It may thus be used to generate high pressure steam and to preheat the air fed to nozzle 115. A fraction of the gases is also burnt in a chamber 121 to raise the temperature of the air to the temperature of melting iron; without this preheating, it is necessary to supply oxygen to nozzle 115 or to charge additional fuel to avoid the reaction being cooled by large volumes of inert cold nitrogen. In fact, it may be desirable to increase the nitrogen content of the air fed to nozzle 115 as a convenient method of supplying heat to the combustion chamber from the hot gases of combustion.

To minimise further contact between the ore and coal and the tubes 112 and therefore build up of slag on the walls, the tubes have a constant cross-section, e. g. they are cylindrical, or they are slightly conical with the wider ends at the bottom. A small amount of upward gas flow of the carbon monoxide and other gases of the partial combustion of the descending coal is permitted within the tubes to reduce the falling speed of the particles and to increase the reduction of the ore. To facilitate this, the tubes 112 are provided at their upper ends with small outlets 123 through which a part of the gas resulting from the partial combustion in the tubes 112 may be allowed to escape; the gases leaving by the outlets 123 may be used for preheating or other heat utilising purposes. A number of tubes 112 are provided as shown and a cyclone or other arrangement 122 automatically classifies the charge according to particle size and feeds each tube 112 with particles of one chosen particle size range. The upward gas flow in each tube is adjusted by outlets 123 to give optimum results for the range.

An advantage of the process just described is that the reaction is self compensating in that the more rapid the reduction, the more rapidly will gas be evolved and the more rapidly will the charge pass down the tubes, and conversely.

It also has the advantage that by the use of a slag trap as before mentioned, it is possible to remove slag and other particles from the hot combustion gases before the latter reach the column 113.

Instead of being introduced into the top of tubes 112, the ore and coal may be fed into the bottom of a bottom sealed heated tube and carried upwards first by the gas generated by the partial combustion of the coal, later supplemented by the gaseous reduction products. On reaching the top the powdered charge descends in another tube to the combustion chamber 114. In this way, reduction of the ore may be increased prior to the combustion chamber.

As previously stated, the combustion chamber 114 is constructed to deposit the slag and metal on the walls. This has the additional advantage of minimising wear and cooling losses. This result is attained by making the conical part 124 as near horizontal as possible and as shown in Figure 2 by providing cooled projections 125 on the wall to hinder the flow of slag over the walls; consequently the average thickness of the slag layers 126 is increased.

In the concurrent flow process of Figure 3, the apparatus comprises a hearth 130 having a gas outlet leading to pipe 131 into which the ore is fed at 132. The ore may be carried in a carrier gas which is preferably the gas generated during a preheating of the ore or the ore may be allowed to fall into the pipe 131. The ore is carried by the hot gases from the hearth round the pipe 131 to the cyclone chamber 133 where the gases leave by the outlet 134 to be used for example for preheating coal used in the reaction, for supplying energy for oxygen production or for depositing carbon for use as a partial substitute for coal. The ores which have been partially reduced by the hot gases during their passage along the pipe 131 are allowed to fall from chamber 133 into a combustion space 135 which may be constructed in the form of a cyclone similar to 114 of Figure 1, and which is supplied with oxygen, which may be in the form of highly heated air, through nozzle 136, powdered coal through nozzle 137, and flux if necessary. The oxygen supply is controllable so that the oxygen potential of the iron may be adjusted to the desired level as before, and the agglomerated metal and slag runs into the hearth 130. The hot gases before leaving by pipe 131 pass over the hearth with all the attendant advantages described in connection with Figure 1.

To avoid deposition in the approaches to combustion area 135, the hot gases and ore are cooled firstly before reaching chamber 133 and secondly in chamber 133 itself. This may be done by heat exchange, the heat transferred being used to preheat the air and coal introduced through nozzles 136, 137 and for other purposes.

A fan is provided to extract the gases through outlet 134. The shape of the combustion space 135 is such that a pressure is produced sufficient, when the fan is operating, to ensure gas flow round the apparatus in the correct sense.

While emphasis has been placed above on the direct production of steel, the reactor 12 may also be used to produce pig iron. The ability to control the oxygen potentials and hence the carbon potential enables any carbon content up to that of pig iron to be obtained. By suitable choice of the charge materials, alloys of a wide range of composition can also be made. It will also be understood that it is equally applicable to the treatment of the ores of other metals.

I claim:

1. A method of treating metallic ores comprising supplying continuously through an entry passage said ores in dispersed state to a reaction passage, causing said ores to pass along said passage to a high temperature region, at least partially reducing said ores during movement along said passage, agglomerating the metal at said high temperature region, controlling the oxygen potential of the metal at said high temperature region, collecting said metal and passing the gases from said region over the collected metal through an outlet passage other than the entry passage for the ores.

2. A method of treating metallic ores comprising supplying through an entry passage metallic ores in finely divided state to a reaction passage, injecting oxygen and a fuel into said passage to provide a high temperature region in said passage, causing said ores to move along said passage to said region and thereby at least partly reducing said ores before arrival at said region, controlling the supply of oxygen to adjust to a desired value the oxygen potential of the metal agglomerated in said region, collecting said agglomerated metal, and passing the hot gases from said region over the collected metal through an outlet passage other than the entry passage for the ores.

3. A method of treating metallic ores comprising supplying through an entry passage metallic ores in finely divided state to a reaction passage, providing a reducing atmosphere in said passage, supplying fuel and oxygen to said passage to provide a high temperature region in said passage, causing said ores to move along said passage to said region, controlling the supply of oxygen to adjust to a desired value the oxygen potential of the metal agglomerated at said region, collecting the agglomerated metal, and passing the hot gases from said region over the collected metal through an outlet passage other than the entry passage for the ores.

4. A method of steel making comprising injecting through an entry passage iron ores in finely divided state and a fuel into a reaction passage, heating said passage, causing said ores and fuel to move along said passage and thereby partially reducing said ores, injecting into said passage a controlled supply of oxygen to at least partly burn said fuel and agglomerate the metal, controlling said supply of oxygen to adjust to a desired value the oxygen potential of the iron and to convert it to steel, collecting the molten steel and passing the hot gases over said collected steel through an outlet passage other than the entry passage for the ores.

5. A steel making process comprising introducing through an entry passage into at least one reaction passage iron ores and a fuel, causing said ores and fuel to pass along said passage to a high temperature region, injecting at said region a controlled supply of oxygen to at least partly burn said fuel and to agglomerate the iron, controlling said oxygen supply to adjust the oxygen potential to convert the agglomerated metal to steel, collecting the molten steel, passing the hot gases from said region over said collected steel through an outlet passage other than the entry passage for the ores and subsequently passing said hot gases over the exterior of said gas passage to cause partial combustion of said fuel and partial reduction of said ores prior to said high temperature region.

6. A steel making process comprising introducing through an entry passage iron ores in finely divided state and a fuel into a column, injecting oxygen at a controlled rate of supply at the bottom of said column to burn at least partly said fuel and to agglomerate the iron, controlling the supply of oxygen to adjust the oxygen potential to convert the agglomerated metal to steel, collecting the molten steel beneath said column, leading the hot gases over the collected steel through an outlet passage other than the entry passage for the ores and subsequently upwardly past the exterior of said column to cause partial combustion of said fuel and partial reduction of said ores prior to said high temperature region.

7. A steel making process comprising introducing through an entry passage iron ores in a finely divided state into a reaction passage, introducing fuel and a controllable supply of oxygen to provide a high temperature region to agglomerate the iron, controlling said supply of oxygen to adjust the oxygen potential of the metal in order to convert it to steel, collecting the molten steel, passing the hot gases from said region over the collected metal and then past said ore entry passage in order to convey said ores to said region and to partially reduce said ores prior to arrival at said region, separating said gases from said ores prior to said region, and discharging the gases through an outlet passage other than the entry passage for the ores.

References Cited in the file of this patent

UNITED STATES PATENTS

| | | |
|---|---|---|
| 960,987 | Moore et al. | June 7, 1910 |
| 1,284,094 | Grouselle | Nov. 5, 1918 |
| 1,815,899 | Brassert | July 28, 1931 |
| 2,739,807 | Stuart | Mar. 27, 1956 |